United States Patent
Horiuchi et al.

(10) Patent No.: US 11,747,546 B2
(45) Date of Patent: Sep. 5, 2023

(54) KEYBOARD AND BACKLIGHT MODULE INCLUDING ADJUSTABLE REFLECTIVE SHEET

(71) Applicant: CHICONY ELECTRONICS CO., LTD., New Taipei (TW)

(72) Inventors: Mitsuo Horiuchi, New Taipei (TW); Chia-Hsin Chen, New Taipei (TW); Ping-Ju Kuo, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 17/702,260

(22) Filed: Mar. 23, 2022

(65) Prior Publication Data

US 2023/0056218 A1   Feb. 23, 2023

Related U.S. Application Data

(60) Provisional application No. 63/235,374, filed on Aug. 20, 2021.

(30) Foreign Application Priority Data

Nov. 18, 2021   (TW) .................................. 110143019

(51) Int. Cl.
    *F21V 8/00*         (2006.01)
(52) U.S. Cl.
    CPC ........... *G02B 6/006* (2013.01); *G02B 6/0055* (2013.01); *G02B 6/0088* (2013.01)

(58) Field of Classification Search
    CPC .... G02B 6/0055; G02B 6/006; G02B 6/0088; G02F 1/1336; H03K 2217/9655
    See application file for complete search history.

(56) References Cited

U.S. PATENT DOCUMENTS

| 11,127,545 B2 | 9/2021 | Horiuchi et al. | |
| 2018/0149797 A1* | 5/2018 | Chen | ...................... G06F 3/0202 |
| 2018/0364765 A1* | 12/2018 | Kitamura | ............... G06F 3/0202 |

FOREIGN PATENT DOCUMENTS

TW    I725438 B    4/2021

* cited by examiner

*Primary Examiner* — Keith G. Delahoussaye
(74) *Attorney, Agent, or Firm* — MUNCY, GEISSLER, OLDS & LOWE, P.C.

(57) ABSTRACT

A keyboard includes a base plate, a plurality of keys and a backlight module. The base plate has a short axis direction and a long axis direction. The keys are disposed on the base plate along the long axis direction, and the keys are arranged to form a plurality of rows. The backlight module is disposed on the base plate and includes a shielding sheet, a light guide plate and a reflecting sheet. The light guide plate is disposed on a lower surface of the shielding sheet. The light guide plate includes a plurality of long openings, and each of the long openings has at least one long side. The long side is parallel to the long axis direction, and each of the long openings has a central axis. The central axis is located between two adjacent rows on which the keys are disposed.

20 Claims, 8 Drawing Sheets

KEYBOARD AND BACKLIGHT MODULE INCLUDING ADJUSTABLE REFLECTIVE SHEET

CROSS REFERENCE TO RELATED APPLICATIONS

This application claims priority of U.S. Provisional Application No. 63/235,374 filed on Aug. 20, 2021 under 35 U.S.C. § 119(e); and this application claims priority of Application No. 110143019 filed in Taiwan on Nov. 18, 2021 under 35 U.S.C. § 119, the entire contents of all of which are hereby incorporated by reference.

BACKGROUND

1. Technical Field

The present disclosure relates to keyboard and to a backlight module of the keyboard.

2. Description of the Related Art

A keyboard is commonly used in conjunction with a computer as one of the essential input devices. The main structures of the keyboard include a base plate, a circuit board and a plurality of keys. The base plate is mainly a plate for assembling the components, and the circuit board and keys are all disposed on the base plate. Generally, there are gaps between the keys. For dustproofing or for preventing light leakage, a frame is disposed on the upper layer of the keyboard. The frame has a plurality of openings for accommodating the keys, so the gaps between the keys are covered by the frame. If the base plate is manufactured with a large tolerance, the keys assembled on the base plate cannot be accurately corresponded to all the openings of the frame, thereby causing difficulty in assembly.

In order to improve the assembly accuracy of the keyboard, a base plate with a long slit (such as Taiwan Patent No. 1725438) has appeared on the market. When the keys on the keyboard cannot be accurately accommodated in the openings of the frame, the length of the base plate can be properly adjusted in the long axis direction due to the structure of the long slit, and then the relative positions of the keys can be adjusted to correspond to the openings in the frame.

In addition, the keyboard is often equipped with a backlight module to form an illuminated keyboard. Generally, the backlight module is fixed to a bottom side of the base plate (i.e., a side opposite to the keys) by adhesion or riveting. However, when the backlight module is assembled to the base plate, even if the base plate has a long slit as described above, the length of the base plate cannot be adjusted due to the limitation of the backlight module. In other words, the conventional backlight module cannot be applied to a base plate of adjustable length.

In addition, a light guide plate of the conventional backlight module has holes for accommodating the light or for fixing with screws. Furthermore, the light guide plate has a plurality of dot-shaped reflective structures. In general, the reflective structures are formed on the light guide plate by means of ink printing. The reflective structures limit the total reflection of the light in the light guide plate such that a portion of the light will change its propagation direction and be guided toward the keys, and the keys will thus be illuminated.

However, the conventional light guide plate does not have the design of concentrating the light in the reflective structures, so the luminous efficiency of the backlight module is reduced. Moreover, the reflective structures of the conventional light guide plate are often incomplete due to printing such that they have flaws such as missing corners, hollows, or unevenness. Because of these flaws, the reflection effect caused by the dot-shaped reflective structures, the light transmittance, and the luminous efficiency of the backlight module are all reduced.

SUMMARY

In view of the above-mentioned problems, the main object of the present disclosure is to provide a keyboard and a backlight module with a reflecting sheet having a structure of slits to solve the problem of the prior art backlight module not being applicable to a base plate of adjustable length.

In order to achieve the above object, the present disclosure provides a keyboard, which comprises a base plate and a backlight module. The base plate has a short axis direction and a long axis direction, and the base plate comprises at least one long slit. The long slit is disposed on the base plate along the short axis direction such that a length of the base plate can be adjusted along the long axis direction. The backlight module is disposed on a side of the base plate. The backlight module comprises a shielding sheet, a light guide plate and a reflecting sheet. The shielding sheet comprises an upper surface and a lower surface, and the upper surface faces toward the base plate. The light guide plate is disposed on the lower surface of the shielding sheet. The reflecting sheet is disposed below the light guide plate. The reflecting sheet comprises a plurality of first slits. When the length of the base plate is adjusted along the long axis direction, the reflective sheet is adjusted and is moved to correspond to the base plate by expansion of the first slits.

In order to achieve the above object, the present disclosure further provides a backlight module, which is applied to a keyboard. The keyboard comprises a base plate having a short axis direction and a long axis direction. Further, the base plate comprises at least one long slit, and the long slit is disposed on the base plate along the short axis direction. The backlight module is disposed on a side of the base plate. The backlight module comprises a shielding sheet, a light guide plate and a reflecting sheet. The shielding sheet comprises an upper surface and a lower surface. The upper surface faces toward the base plate. The light guide plate is disposed on the lower surface of the shielding sheet. The reflecting sheet is disposed below the light guide plate. The reflecting sheet comprises a plurality of first slits. When the length of the base plate is adjusted along the long axis direction, the reflective sheet is adjusted and is moved to correspond to the base plate by expansion of the first slits.

According to an embodiment of the present disclosure, the two adjacent first slits are partly overlapped in the short axis direction, and there is a space between the two adjacent first slits in the long axis direction.

According to an embodiment of the present disclosure, the reflecting sheet comprises a plurality of holes, and one end of each of a plurality of the first slits is connected to the holes.

According to an embodiment of the present disclosure, the holes comprise a plurality of fixing holes, and the fixing holes are arranged between a plurality of the first slits to form a least one slit distribution area. Further, the slit distribution area is arranged on the reflecting sheet along the short axis direction such that the reflecting sheet is divided into a first portion and a second portion by the slit distribution area in the long axis direction.

According to an embodiment of the present disclosure, each of the first slits comprises a vertical section, and the vertical section is parallel to the short axis direction.

According to an embodiment of the present disclosure, a plurality of the first slits further comprise a horizontal section, and the horizontal section is parallel to the long axis direction.

According to an embodiment of the present disclosure, the vertical section and the horizontal section are connected to each other. One end of the vertical section or one end of the horizontal section is connected to the fixing holes.

According to an embodiment of the present disclosure, the holes comprise a plurality of through holes. The diameter of each of the through holes is smaller than the diameter of each of the fixing holes. Further, one end of each of the plurality of the first slits is connected to the through holes According to an embodiment of the present disclosure, the position of the slit distribution area corresponds to the position of the long slit of the base plate.

According to an embodiment of the present disclosure, the reflecting sheet is adhesively connected to the base plate.

According to an embodiment of the present disclosure, the reflecting sheet is adhesively connected to the shielding sheet, the shielding sheet comprises a plurality of second slits, and the upper surface of the shielding sheet is adhesively connected to the base plate.

According to an embodiment of the present disclosure, the spacing is between 0.01 mm and 0.3 mm wide.

In order to achieve the above object, the present disclosure provides a keyboard, which comprises a base plate, a plurality of keys and a backlight module. The base plate has a short axis direction and a long axis direction. The keys are disposed on the base plate along the long axis direction, and the keys are arranged to form a plurality of rows. The backlight module is disposed on a side of the base plate. The backlight module comprises a shielding sheet, a light guide plate and a reflecting sheet. The shielding sheet comprises an upper surface and a lower surface, and the upper surface faces toward the base plate. The light guide plate is disposed on the lower surface of the shielding sheet. The light guide plate comprises a plurality of long openings, and each of the long openings has at least one long side. The long side is parallel to the long axis direction, and each of the long openings has a central axis. The central axis is located between two adjacent rows on which the keys are disposed. The reflecting sheet is disposed below the light guide plate.

In order to achieve the above object, the present disclosure further provides a backlight module, which is applied to a keyboard. The keyboard comprises a base plate and a plurality of keys. The base plate has a short axis direction and a long axis direction. The keys are disposed on the base plate along the long axis direction, and the keys are arranged to form a plurality of rows. The backlight module is disposed on a side of the base plate. The backlight module comprises a shielding sheet, a light guide plate and a reflecting sheet. The shielding sheet comprises an upper surface and a lower surface, and the upper surface faces toward the base plate. The light guide plate is disposed on the lower surface of the shielding sheet. The light guide plate comprises a plurality of long openings, and each of the long openings has at least one long side. The long side is parallel to the long axis direction, and each of the long openings has a central axis. The central axis is located between two adjacent rows on which the keys are disposed. The reflecting sheet is disposed below the light guide plate.

According to an embodiment of the present disclosure, each of the long openings is rectangular.

According to an embodiment of the present disclosure, the at least one long side of each of the long openings is located within the orthographic projection below the keys.

According to an embodiment of the present disclosure, there is a space between the two adjacent long openings in the long axis direction.

According to an embodiment of the present disclosure, the reflecting sheet passes through the long openings and is adhesively connected to the shielding sheet.

According to an embodiment of the present disclosure, a length of the long side of one of the long openings is greater than a width of one of the keys.

In order to achieve the above object, the present disclosure provides a keyboard, which comprises a base plate, a plurality of keys and a backlight module. The base plate has a short axis direction and a long axis direction. The keys are disposed on the base plate. The backlight module is disposed on a side of the base plate. The backlight module comprises a shielding sheet, a light guide plate and a reflecting sheet. The shielding sheet comprises an upper surface and a lower surface, and the upper surface faces toward the base plate. The light guide plate is disposed on the lower surface of the shielding sheet. The light guide plate comprises a plurality of light guide structures corresponding to the keys respectively. Each of the light guide structures comprises a ring portion and at least one bend line portion. The bend line portion connects to the ring portion, and the ring portion is formed by a plurality of bending portions. The reflecting sheet is disposed below the light guide plate.

In order to achieve the above object, the present disclosure further provides a backlight module, which is applied to a keyboard. The keyboard comprises a base plate and a plurality of keys, and the keys are disposed on the base plate. The base plate has a short axis direction and a long axis direction. The backlight module is disposed on a side of the base plate. The backlight module comprises a shielding sheet, a light guide plate and a reflecting sheet. The shielding sheet comprises an upper surface and a lower surface, and the upper surface faces toward the base plate. The light guide plate is disposed on the lower surface of the shielding sheet. The light guide plate comprises a plurality of light guide structures corresponding to the keys respectively. Each of the light guide structures comprises a ring portion and at least one bend line portion. The bend line portion connects to the ring portion, and the ring portion is formed by a plurality of bending portions. The reflecting sheet is disposed below the light guide plate.

According to an embodiment of the present disclosure, the keyboard further comprises an elastic body having an annular base, and the ring portion is disposed corresponding to the annular base.

According to an embodiment of the present disclosure, the bend line portion corresponds to one corner of one of the keys.

According to an embodiment of the present disclosure, each of the light guide structures has four bend line portions corresponding to the four corners of one of the keys.

According to an embodiment of the present disclosure, the light guide structures are a plurality of arc-grooves formed on a surface of the light guide plate.

According to an embodiment of the present disclosure, the bending portions of the ring portion respectively include a circular shape, an arc shape, or a linear shape.

According to an embodiment of the present disclosure, the bend line portion is denser than the ring portion.

In continuation of the description above, the keyboard of the present disclosure comprises a base plate and a backlight module. The base plate has a long slit along the short axis direction to allow adjustment of the length of the base plate. A reflecting sheet of the backlight module comprises a plurality of (first) slits. By the structure described above, the length of the reflecting sheet can be adjusted by moving it along with the base plate. By the same token, the length of the backlight module can also be adjusted by moving it along with the base plate.

In addition, a light guide plate has a plurality of long openings which are rectangular. In other words, each of the long openings has at least one long side, and the long side is parallel to the long axis direction of the base plate. The central axis of each of the long openings is located between two adjacent rows on which the keys are disposed such that the light within the light guide plate can be concentrated on the rows on which the keys are disposed. Thus, the light can be effectively guided to the light guide structures to improve the luminous efficiency of the backlight module.

In addition, a light guide structure of the light guide plate comprises a ring portion and at least one bend line portion. Due to the connection of the bend line portion to the ring portion, the light within the light guide plate can be concentrated on the ring portion and the bend line portion and especially concentrated on the bend line portion. Moreover, the ring portion and the bend line portion are not prone to forming incomplete structures such as obvious missing corners, hollows, or unevenness, so the reflection effect and light transmittance can be improved, and the luminous efficiency of the backlight module can also be improved.

DETAILED DESCRIPTION OF THE EMBODIMENTS

In order to make the structure, characteristics, and effectiveness of the present disclosure further understood and recognized, a detailed description of the present disclosure is provided as follows, along with embodiments and accompanying figures.

Figure 1:
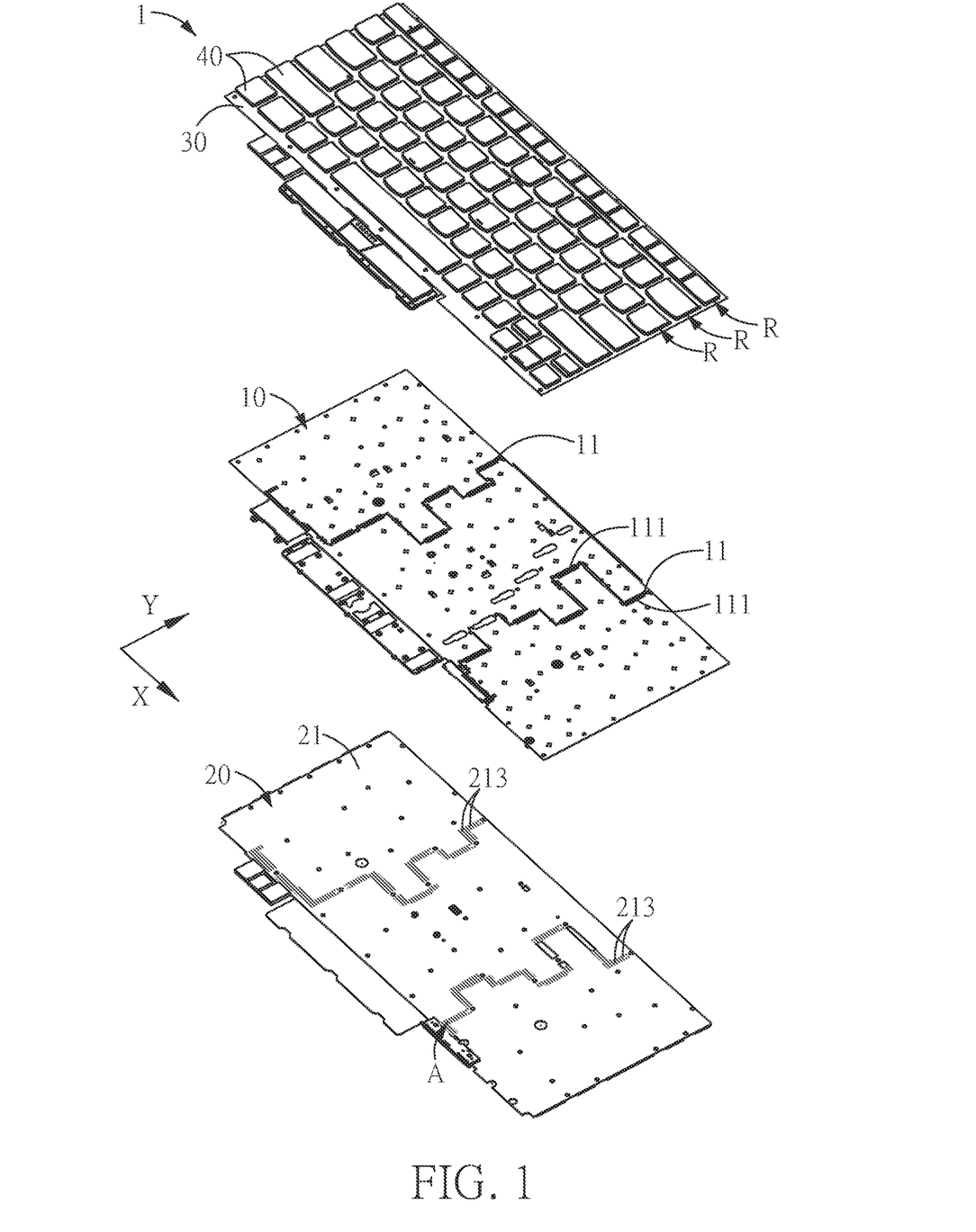
FIG. 1 is an exploded schematic diagram of a keyboard according to an embodiment of the present disclosure.
Figure 2:
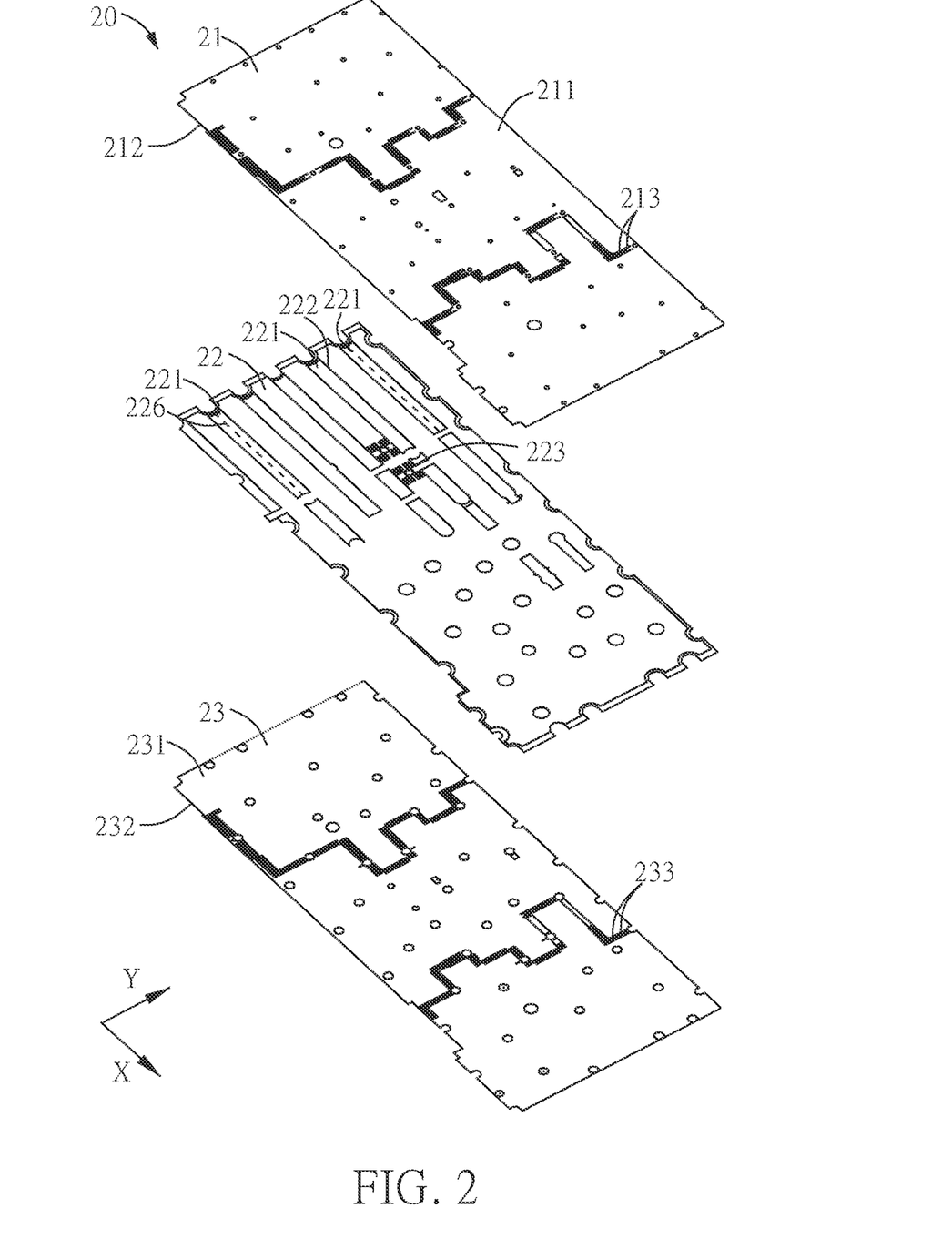
FIG. 2 is an exploded schematic diagram of a backlight module shown in FIG. 1.

FIG. 1 is an exploded schematic diagram of a keyboard according to an embodiment of the present disclosure; FIG. 2 is an exploded schematic diagram of a backlight module shown in FIG. 1; and FIG. 3 is a schematic diagram of the lower surface of a reflecting sheet shown in FIG. 2.

Figure 3:
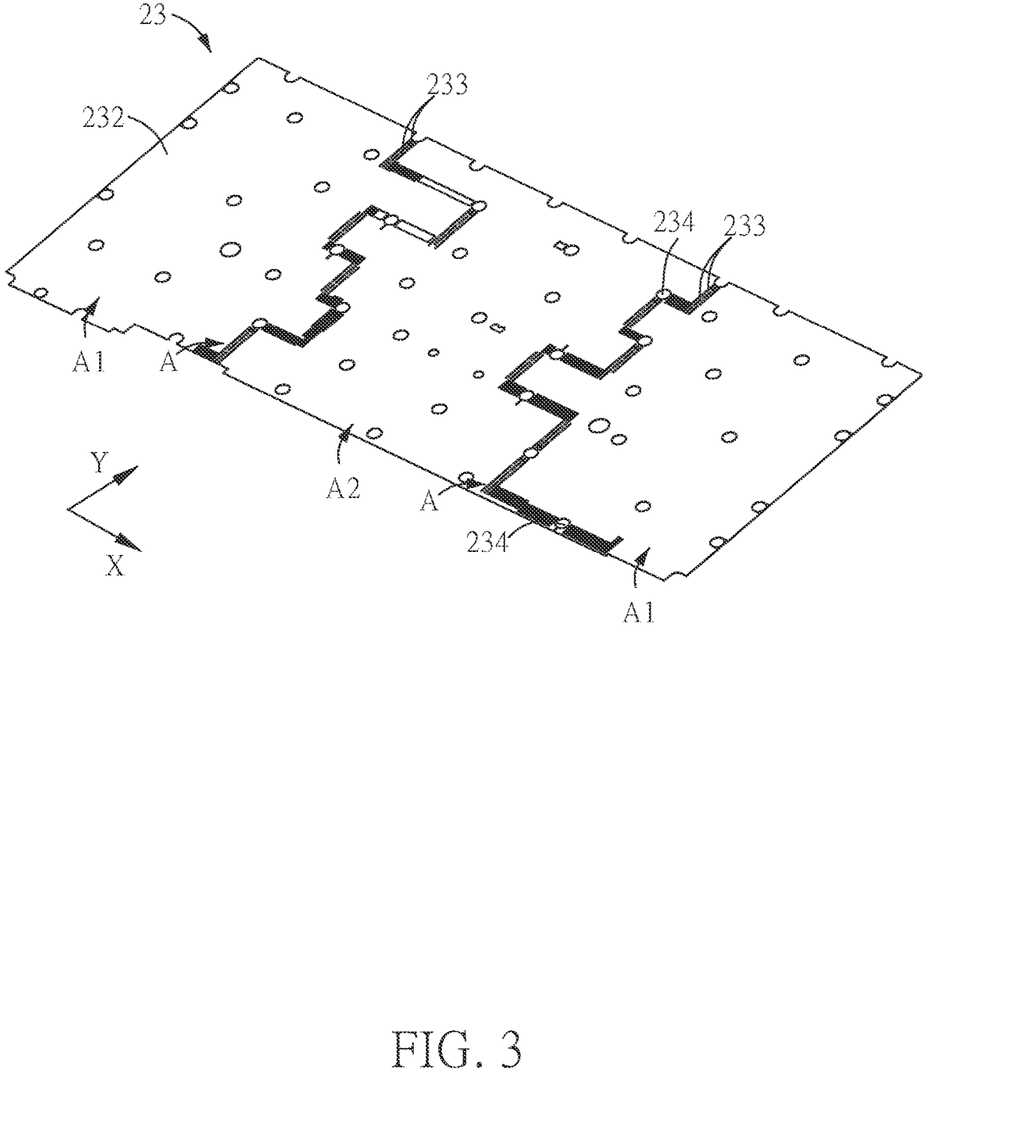
FIG. 3 is a schematic diagram of the lower surface of a reflecting sheet shown in FIG. 2.

Please refer to FIG. 1, FIG. 2 and FIG. 3. In this embodiment, the keyboard 1 comprises a base plate 10, a backlight module 20, a circuit board 30 and a plurality of keys 40. Generally, the base plate 10 comprises a plurality of assembled areas (not shown in figures) for assembling the keys 40 thereon. The circuit board 30 is disposed above the base plate 10 and is located below the keys 40. When the keys 40 are pressed, the switches disposed on the circuit board 30 are triggered to send the corresponding input signals.

The base plate 10 has a short axis direction Y and a long axis direction X. Specifically, the keyboard 1 is rectangular, and correspondingly, the base plate 10, backlight module 20 and the circuit board 30 are also rectangular and have a short axis direction Y and a long axis direction X. In this embodiment, the short axis direction Y and the long axis direction X of the base plate 10 are used as an example for description. In this embodiment, the base plate 10 is a metal plate. The keys 40 are disposed on the base plate 10 along the long axis direction X and arranged to form a plurality of rows R.

In addition, the base plate 10 comprises at least one long slit 11. In this embodiment, the base plate 10 comprises two long slits 11, as shown in FIG. 1. The long slits 11 are disposed on the base plate 10 along the short axis direction Y. The base plate 10 is provided with a plurality of elastic connecting members 111 at the long slits 11 so that the different areas divided by the long slit 11 can be connected to each other, and the relative position of the different areas can be adjusted according to the assembly requirements. The structures of the long slits 11 allow adjustment of the length of the base plate 10, and the structure of the elastic connecting members 111 is such that the base plate 10 is not divided into a plurality of independent plates by the long slits 11. Because the structure and connection of the elastic connecting members 111 are not the focus of this disclosure, they will not be described in detail here. When the two short sides of the base plate 10 are pulled outward or pushed inward, the width of the long slit 11 is increased or decreased such that the length of the base plate 10 can be adjusted in the long axis direction X, thereby allowing fine-tuning of the positions of the keys 40 disposed on the base plate 10. Preferably, the long slit 11 does not traverse the base plate 10 in a straight line but follows a path that avoids the positions of the keys 40. In another embodiment, the base plate 10 may comprise a plurality of long slits 1I shorter than those of the above embodiment, and there is a space between two adjacent shorter long slits 11 in the long axis direction X.

In this embodiment, the backlight module 20 is disposed on a side of the base plate 10 and located on a side of the base plate 10, which is the side opposite to the keys 40. The backlight module 20 comprises a shielding sheet 21, a light guide plate 22 and a reflecting sheet 23. The shielding sheet 21 comprises an upper surface 211 and a lower surface 212, and the upper surface 211 faces toward the base plate 10. The light guide plate 22 is disposed on the lower surface 212 of the shielding sheet 21, and the reflecting sheet 23 is disposed below the light guide plate 22. In other words, the light guide plate 22 is disposed between the shielding sheet 21 and the reflecting sheet 23.

Generally, the shielding sheet 21 includes a light-shielding portion and a plurality of translucent portions (not shown in figures). The translucent portions correspond to the keys 40 respectively such that the light emitted by the backlight module 20 can be directed to the keys 40. The light-shielding portion is used to shield the portion that does not need to be illuminated, such as the space between the keys 40. In this embodiment, the shielding sheet 21 is made of a transparent film (e.g., Polyethylene Terephthalate, PET), and the light-shielding portion is printed on the transparent film. Further, the backlight module 20 comprises at least one light emitting unit (e.g., a light-emitting diode, not shown in figures), which is disposed on a side of the light guide plate 22, and the light emitted by the light-emitting unit is evenly distributed on the entire surface by the light guide plate 22. The reflecting sheet 23 is used to reflect the light toward the keys 40 to increase the luminous efficiency of the backlight module 20. Preferably, the reflecting sheet 23 is made of a film, and the reflecting sheet 23 is provided with a reflective surface or coated with reflective materials on the surface facing the light guide plate 22 to reflect the light. Specifically, the light reflected by the light guide plate 22 directly passes through the translucent portions of the shielding sheet 21 or is reflected to the translucent portions by the reflecting sheet 23, and then the light passes through the surface or the periphery of the keys 40.

Figure 4:
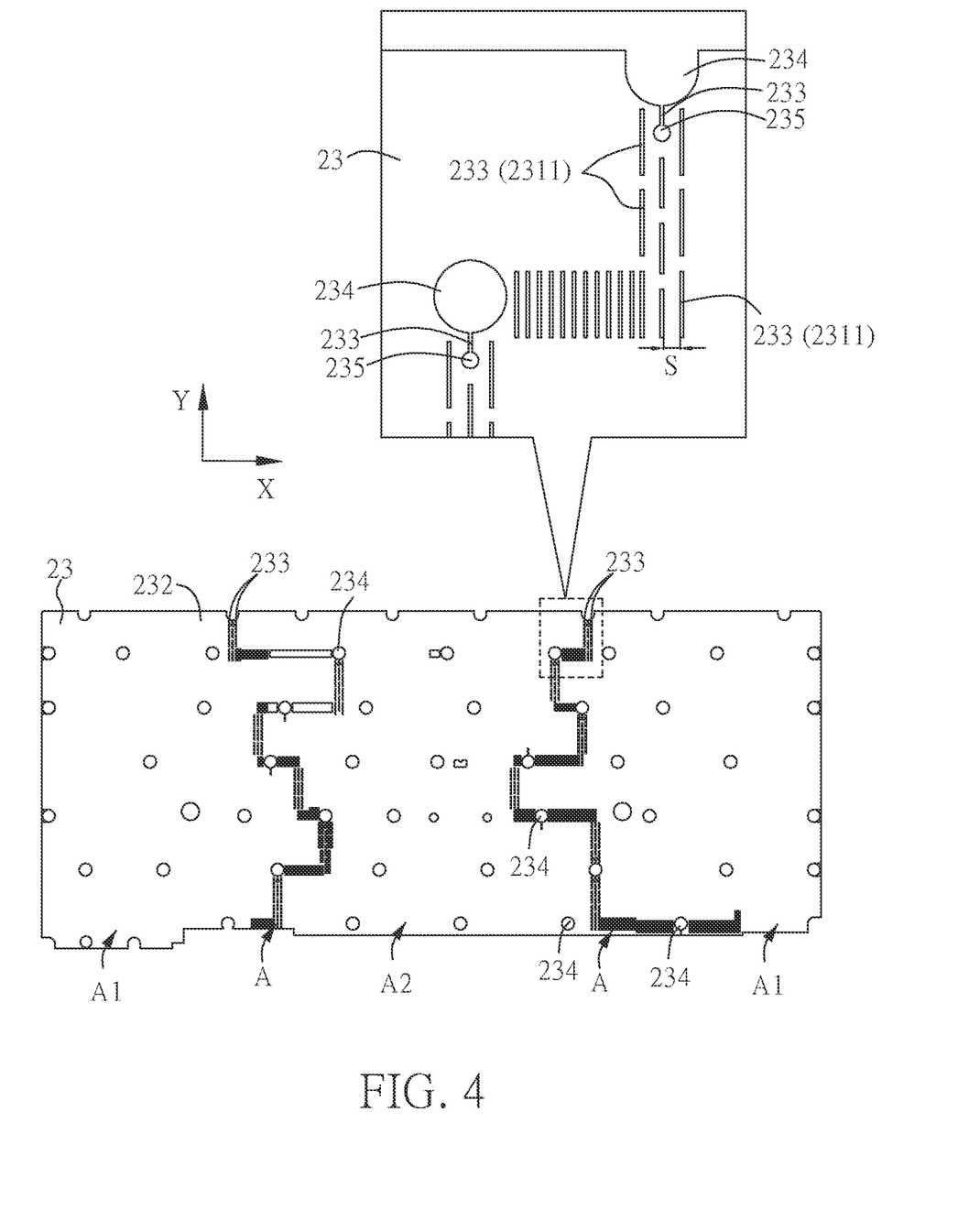
FIG. 4 is a top view of the reflecting sheet shown in FIG. 3.

In this embodiment, the reflecting sheet 23 is the bottom layer of the backlight module 20. Further, the reflecting sheet 23 also has an upper surface 231 and a lower surface 232. FIG. 3 shows the lower surface 232 of the reflecting sheet 23. FIG. 4 is a top view of the reflecting sheet shown in FIG. 3.

Please refer to FIG. 1, FIG. 2, FIG. 3 and FIG. 4. In this embodiment, the reflecting sheet 23 comprises a plurality of first slits 233. When the length of the base plate 10 in the long axis direction X is adjusted, the first slits 233 are expanded (i.e., the width of the first slits 233 is increased) such that the reflecting sheet 23 can be adjusted to expand according to the base plate 10.

Specifically, the two adjacent first slits 233 are partly overlapped in the short axis direction Y. Specifically, the first slits 233 of this embodiment are arranged vertically and are referred to as vertical sections 2331. The vertical sections 2331 are parallel to the short axis direction Y. Thus, the two adjacent first slits 233 are at least partly overlapped or completely overlapped in the short axis direction Y. Further, there is a space S between the two adjacent first slits 233 in the long axis direction X. Preferably, the space S is between 0.01 mm and 0.3 mm wide.

Because the reflecting sheet 23 has a plurality of first slits 233, the two adjacent first slits 233 are partly overlapped in the short axis direction Y, and there is a space S in the long axis direction X, the length of the backlight module 20 can be adjusted according to the base plate 10. Specifically, when the two short sides of the base plate 10 are pulled outward, the length of the base plate 10 in the long axis direction X is increased by widening of the long slits 11. At the same time, the two short sides of the reflecting sheet 23 are moved outward along with the base plate 10, and the first slits 233 are expanded, thereby increasing the length of the reflecting sheet 23 in the long axis direction X. Thus, the length of the reflecting sheet 23 disposed on the bottom layer of the backlight module 20 can be adjusted along with the base plate 10. In brief, the backlight module 20 of this embodiment can be applied to a base plate 10 of adjustable length.

The reflecting sheet 23 comprises a plurality of holes, which include a plurality of fixing holes 234 and a plurality of through holes 235. In other words, the holes are of two types: fixing holes 234 or through holes 235. In this embodiment, the through holes 235 and the fixing holes 234 are circular holes, and the diameter of each of the through holes 235 is smaller than the diameter of each of the fixing holes 234, but the present disclosure is not limited thereto. The shape and the size of the through holes 235 and the fixing holes 234 can be adjusted according to requirements. The fixing holes 234 are used for fixing members such as screws to pass through for assembly of the backlight module 20. For example, the screws can pass through the fixing holes 234 to fix the electronic components of the backlight module 20 or to mount the backlight module 20 on the base plate 10. In this embodiment, the first slits 233 are arranged between a portion of the fixing holes 234 to form at least one slit distribution area A. Further, the slit distribution area A is arranged on the reflecting sheet 23 mainly along the short axis direction Y such that the reflecting sheet 23 is divided into a first portion A1 and a second portion A2 by the slit distribution area A in the long axis direction X. Preferably, the position of the slit distribution area A corresponds to the position of one of the long slits 11 of the base plate 10 (as shown in FIG. 1).

In this embodiment, the first slits 233 are arranged to form two slit distribution areas A such that the reflecting sheet 23 is divided into two first portions A1 and one second portion A2, as shown in FIG. 3 and FIG. 4. The two first portions A1 are on the outside, and the second portion A2 is in between them. When the two short sides of the reflecting sheet 23 move outward with the base plate 10, the width of the first slits 233 is increased, and the first portions A1 and the second portion A2 are separated from one another, thereby increasing the length of the reflecting sheet 23 in the long axis direction X.

In this embodiment, one end of each of a plurality of the first slits 233 connects to the holes, such as the fixing holes 234 or the through holes 235, to increase the width by which the first slits 233 are pulled apart. Further, two opposite ends of the plurality of the first slits 233 respectively connect to the fixing holes 234 and the through holes 235. This structure can also achieve the effect of increasing the width by which the first slits 233 can be pulled apart and increase the tensile strength of the reflecting sheet 23 to prevent damage to the reflecting sheet 23 during expansion.

Figure 5:
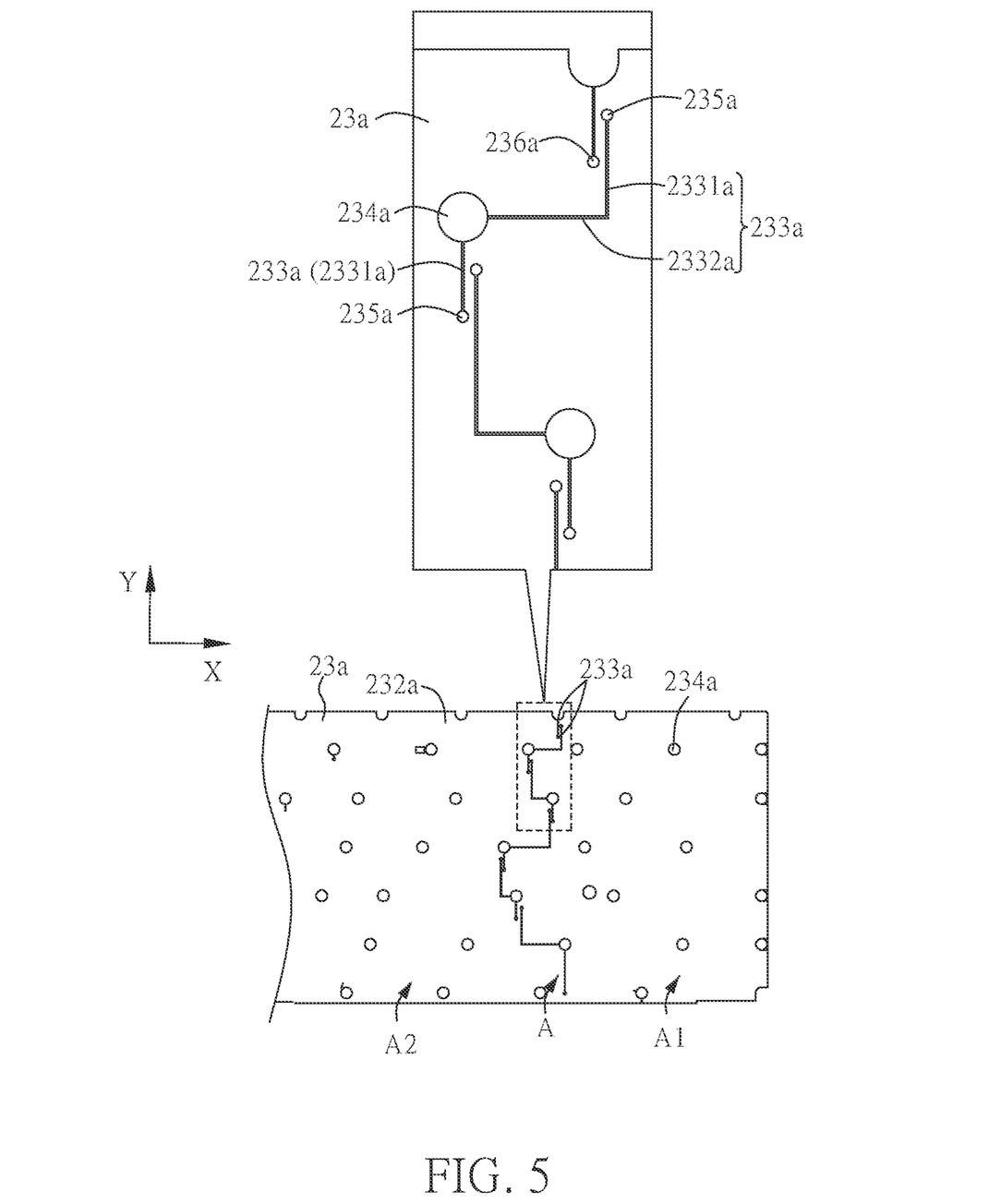
FIG. 5 is a top view of a reflecting sheet according to another embodiment of the present disclosure.

FIG. 5 is a top view of a reflecting sheet according to another embodiment of the present disclosure. Please refer to FIG. 5. In this embodiment, each of the first slits 233a of the reflecting sheet 23a also comprises a vertical section 2331a. The difference from the above embodiment is that the plurality of the first slits 233a further comprise a horizontal section 2332a, and the vertical section 2331a and the horizontal section 2332a are connected to each other. Preferably, the vertical section 2331a is parallel to the short axis direction Y and the horizontal section 2332a is parallel to the long axis direction X so that the included angle between the vertical section 2331a and the horizontal section 2332a is 90 degrees. However, the present disclosure is not limited thereto; the included angle between the vertical section 2331a and the horizontal section 2332a can be adjusted according to requirements.

Similarly, two ends of the first slit 233a are provided with the holes (i.e., the fixing holes 234a or the through holes 235a) to increase the tensile strength of the reflecting sheet 23a and to prevent damage to the reflecting sheet 23a during expansion. Preferably, one end of the vertical section 2331a or one end of the horizontal section 2332a connects to the fixing holes 234a. In this embodiment, one end of the horizontal section 2332a connects to the fixing holes 234a. Similarly, the reflecting sheet 23a of this embodiment comprises a plurality of through holes 235a, and two opposite ends of the plurality of the first slits 233a respectively connect to the fixing holes 234a and the through holes 235a. In this embodiment, one end of the horizontal section 2332a connects to the fixing holes 234a, and one end of the vertical section 2331a connects to the through holes 235a. Further, two ends of the vertical section 2331a (i.e., the first slits 233a without the horizontal section 2332a) respectively connect to the fixing holes 234a and the through holes 235a. In another embodiment, the vertical section 2331a may also connect to the fixing holes 234a, and the horizontal section 2332a connects to the through holes 235a.

Figure 6:
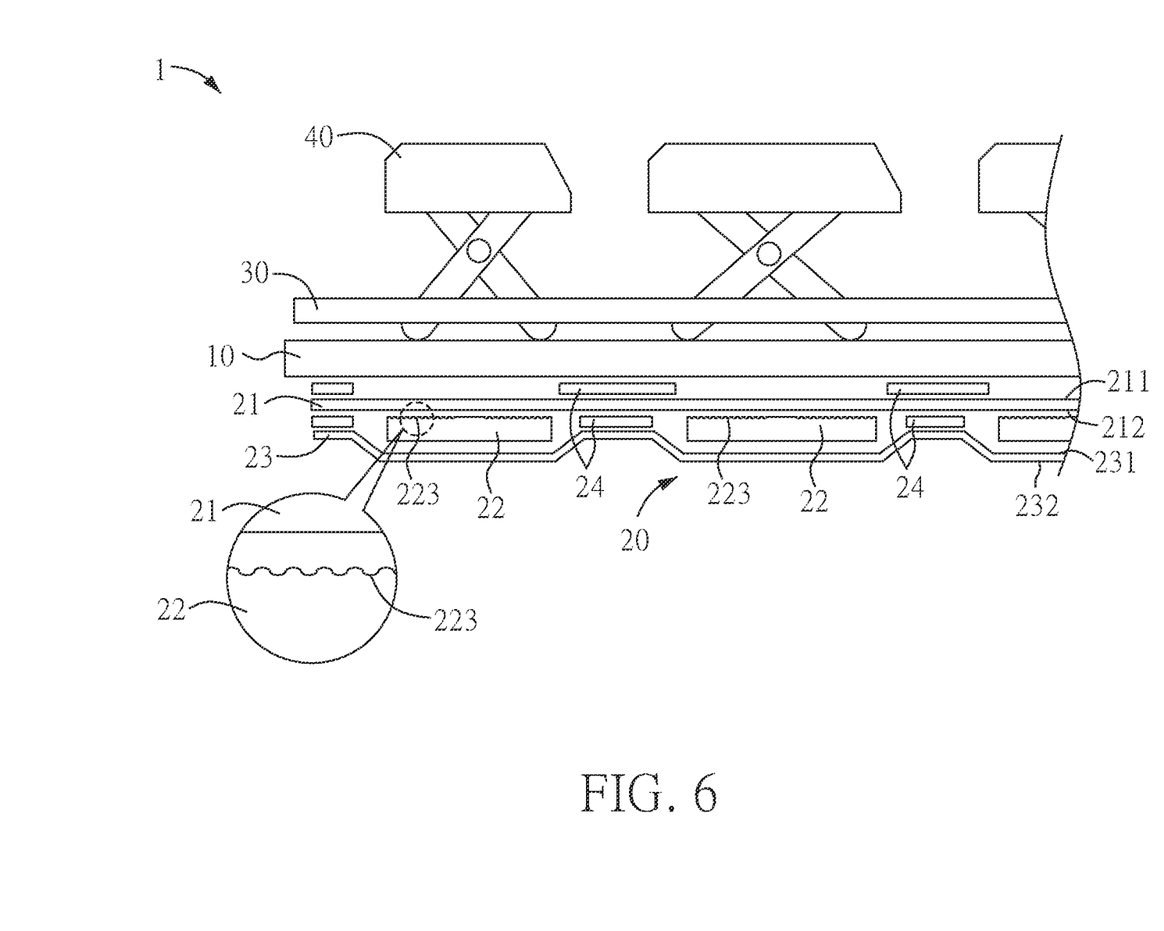
FIG. 6 is a sectional schematic diagram of the keyboard shown in FIG. 1 in the assembled state.
Figure 7:
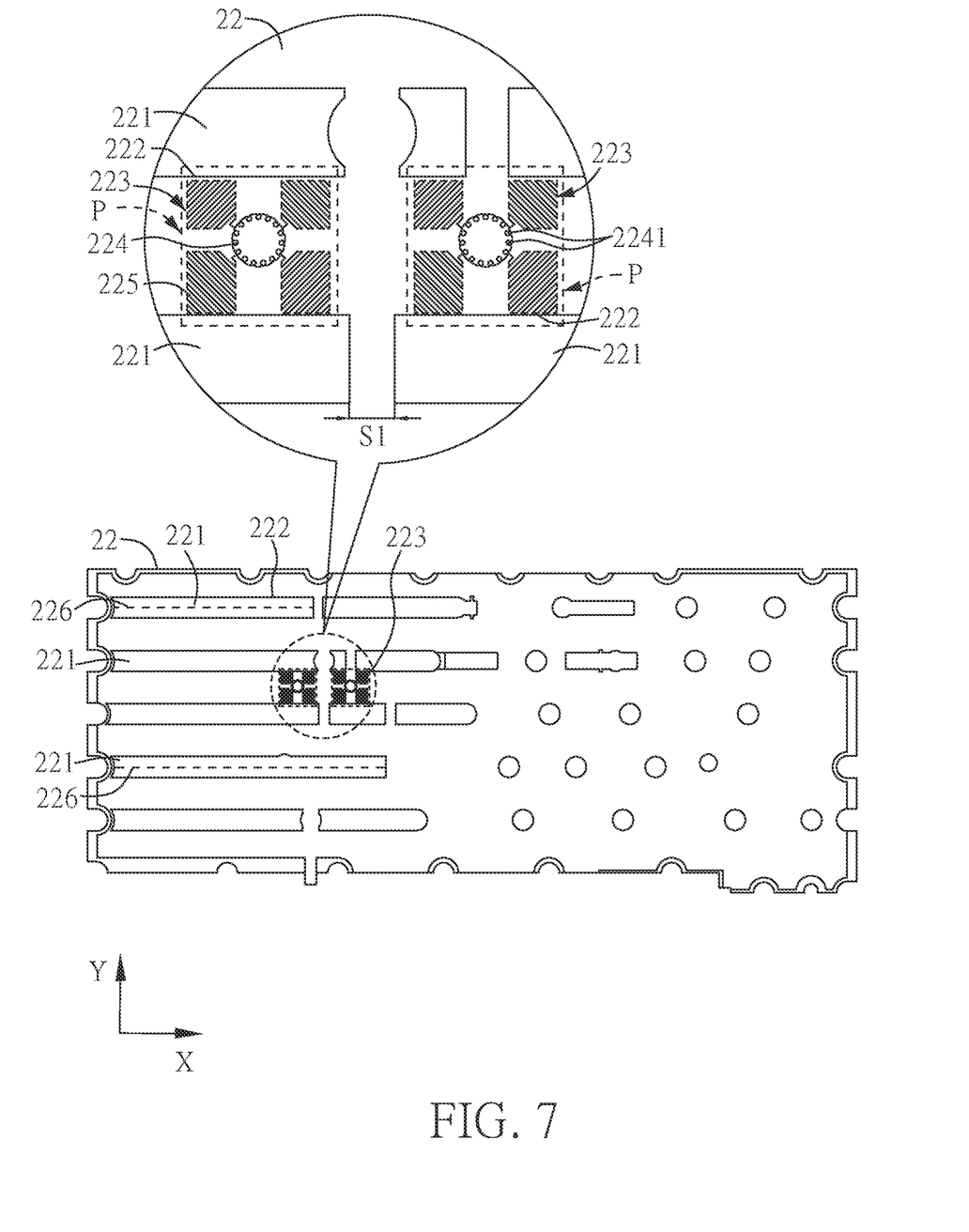
FIG. 7 is a top view of a light guide plate shown in FIG. 2.

FIG. 6 is a sectional schematic diagram of the keyboard shown in FIG. 1 in the assembled state; FIG. 7 is a top view of a light guide plate shown in FIG. 2. Please refer to FIG. 2, FIG. 6 and FIG. 7. It should be noted that FIG. 6 is a sectional schematic diagram of the assembled keyboard 1 along the short axis direction Y. In this embodiment, the upper surface 231 of the reflecting sheet 23 is adhesively connected to the lower surface 212 of the shielding sheet 21, and the upper surface 211 of the shielding sheet 21 is adhesively connected to the base plate 10. For example, the backlight module 20 further comprises adhesive layers 24, which are disposed on the upper surfaces 231, 211 of the reflecting sheet 23 and the shielding sheet 21, respectively. After the reflecting sheet 23 covers the light guide plate 22 and is adhesively connected to the shielding sheet 21 by the adhesive layers 24, the backlight module 20 is assembled (or adhesively connected) to the base plate 10 by the adhesive layers 24 located on the upper surface 211 of the shielding sheet 21.

Specifically, the light guide plate 22 of this embodiment comprises a plurality of long openings 221, and a portion of the reflecting sheet 23 passes through the long openings 221 to be adhesively connected to the shielding sheet 21. Each of the long openings 221 of the light guide plate 22 has at least one long side 222. In this embodiment, each of the long openings 221 has two long sides 222 parallel to each other, and each of the long openings 221 also has a central axis 226 parallel to the long sides 222. It should be noted that the central axis 226 is a virtual reference line, so it is marked with a broken line in FIG. 2 and FIG. 7, which show the central axis 226 of two of the long openings 221.

Please refer to FIG. 1, FIG. 2 and FIG. 7. The long side 222 and the long axis direction X are parallel to each other, and the central axis 226 of the long opening 221 is located between two adjacent rows R on which the keys 40 are disposed. In other words, the long openings 221 of this embodiment are rectangular and correspond to light-shielding areas of the keyboard 1. Generally, there are translucent characters on the keys 40, so the light-shielding areas are located between two adjacent rows R. The positions of the central axis 226 of the long openings 221 correspond to the light-shielding areas, respectively. Because the hollow area of a long opening 221 is not translucent, the structures of the long openings 221 can reduce the manufacturing cost of the light guide plate 22; moreover, the light within the light guide plate 22 can be concentratedly transmitted to the rows R on which the keys 40 are disposed, to improve the luminous efficiency of the backlight module 20. Specifically, the light is reflected by the light guide plate 22 and passes through the edges of the holes of the light guide plate 22 such that the edges of the long openings 221 have greater brightness. Preferably, the at least one long side 222 of each of the long openings 221 is located within the orthographic projection P (i.e., the block with a broken line shown in FIG. 7) below the translucent characters of the keys 40 in two adjacent rows R to improve the luminous efficiency.

Preferably, the length of the long side 222 of each of the long openings 221 is greater than the width of one of the keys 40. In other words, the length of the long side 222 is greater than the width of a single key 40. In this embodiment, the range of the long side 222 may cover 2 to 4 of the keys 40. Moreover, there is a space S1 between two adjacent long openings 221 in the long axis direction X (as shown in FIG. 7) so that the light guide plate 22 will not be broken due to the division of the long openings 221 so as to maintain the integrity of the light guide plate 22. Preferably, the paths of the light emitted by the light-emitting unit on the long side 222 are parallel to each other, which is beneficial to improve the efficiency of the light transmission.

In addition, the light guide plate 22 of this embodiment further comprises a plurality of light guide structures 223, and the positions of the light guide structures 223 correspond to the keys 40, respectively. It should be noted that, for simplicity of illustration, FIG. 2 and FIG. 7 show only two of the light guide structures 223. Actually, the light guide structures 223 can be formed at the positions corresponding to each of the keys 40. In this embodiment, the light guide structures 223 are microstructures (e.g., arc-shaped grooves) formed on one surface of the light guide plate 22 to destroy the total reflection of the light in the light guide plate 22 such that a portion of the light will be guided toward the corresponding keys 40, and the keyboard 1 will be illuminated. In this embodiment, the light guide structures 223 are disposed on the upper surface of the light guide plate 22, but the present disclosure is not limited thereto. In another embodiment, the light guide structures 223 may be disposed on the lower surface of the light guide plate 22 or on both the upper and the lower surfaces of the light guide plate 22.

In this embodiment, each of the light guide structures 223 comprises a ring portion 224 and at least one bend line portion 225, and the bend line portion 225 connects to the ring portion 224. The keyboard 1 further comprises an elastic body (not shown in figures) disposed between the keys 40 and the base plate 10. The elastic body may be a rubber dome, and the elastic body has an annular base. Preferably, the ring portion 224 is disposed corresponding to the annular base of the elastic body. Specifically, the ring portion 224 may be disposed on the outer edge of the annular base or below the annular base to ensure uniform brightness in the central area of the keys 40. Furthermore, the ring portion 224 is formed by a plurality of bending portions 2241, and the bending portions 2241 may be but are not limited to a circular shape, an arc shape, or a linear shape. In this embodiment, the bending portions 2241 are circular such that the ring portion 224 is formed in a ring structure like a coiled handset cord, as shown in FIG. 7. In another embodiment, if the bending portions 2241 are arc-shaped or semi-circular, the entire ring portion 224 may be formed in a ring structure like the petals of a flower. If the bending portions 2241 are linear, the entire ring portion 224 may be formed in a ring structure with a zig-zag shape. In addition, the bend line portion 225 is a bending linear structure, and the lines of the bend line portion 225 are denser and more concentrated than the ring portion 224.

The long openings 221 allow the light from the light guide plate 22 to be concentrated on the area with the light guide structures 223, and the light guide structures 223 allow the light to be more concentrated. That is, the light can be concentrated on the ring portion 224 and the bend line portion 225, and especially on the bend line portion 225. The structures of the ring portion 224 and the bend line portion 225 destroy the total reflection of the light such that a portion of the light is projected upward to the keys 40 to achieve the illuminated display function of the keys 40. Generally, the characters of the keys 40 are translucent, so the position of the bend line portion 225 can correspond to the characters of one of the keys 40. For example, a character may be located on a corner of the key 40, so the bend line portion 225 corresponds to the corner of the key 40. In this embodiment, each of the light guide structures 223 has four bend line portions 225 respectively corresponding to four corners of the key 40. Unlike the conventional reflective structures, the ring portion 224 and the bend line portion 225 of the light guide structures 223 are not prone to forming incomplete structures or having flaws such as obvious missing corners, hollows, or unevenness, so the reflection effect and light transmittance can be improved, and the luminous efficiency of the backlight module 20 can also be improved.

Preferably, the light guide structures 223 are a plurality of arc-shaped grooves formed on one surface of the light guide plate 22, as shown in FIG. 6. Specifically, the light guide structures 223 can be formed on the surface of the light guide plate 22 by roll forming, and the manufacturing method of roll forming can produce arc-shaped grooves with gentle angles. Because the development of the backlight module 20 is thinning, the thickness of the light guide plate 22 is increasingly reduced. Generally, the microstructures formed on the light guide plate 22 by hot pressing or laser engraving will be relatively sharp grooves, which could easily cause damage to the thin light guide plate 22. In contrast, the light guide structures 223 of this embodiment are arc-shaped grooves with gentle angles, which can prevent damage to the thin light guide plate 22.

Preferably, the shielding sheet 21 of this embodiment may also include a plurality of slits, which are referred to as second slits 213 herein, as shown in FIG. 2. When the two short sides of the base plate 10 are pulled outward, the two short sides of the shielding sheet 21 and the reflecting sheet 23 are moved outward along with the base plate 10 such that the second slits 213 of the shielding sheet 21 and the first slits 233 of the reflecting sheet 23 are expanded, and the backlight module 20 can be applied to the base plate 10 of adjustable length. Preferably, the distribution of the second slits 213 of the shielding sheet 21 corresponds to the distribution of the first slits 233 of the reflecting sheet 23; that is, the second slits 213 of the shielding sheet 21 are also arranged in a shape similar to that of the slit distribution area A.

The problem of light leakage may occur at the first slits 233 of the reflecting sheet 23 or at the second slits 213 of the shielding sheet 21. The space S1 (shown in FIG. 7) between two adjacent long openings 221 in the long axis direction X will cause a dark area because the position of the space S1 is not on the propagation path of the light. Thus, the space S1 can be disposed corresponding to the overlap position of the long openings 221 of the light guide plate 22 and the first slits 233a to mitigate the problem of light leakage. In addition, the area of the first slits 233 of the reflecting sheet 23 (on the upper surface 231) and the area of the second slits 213 of the shielding sheet 21 (on the lower surface 212) can be coated with ink to reduce the light leakage.

Figure 8:
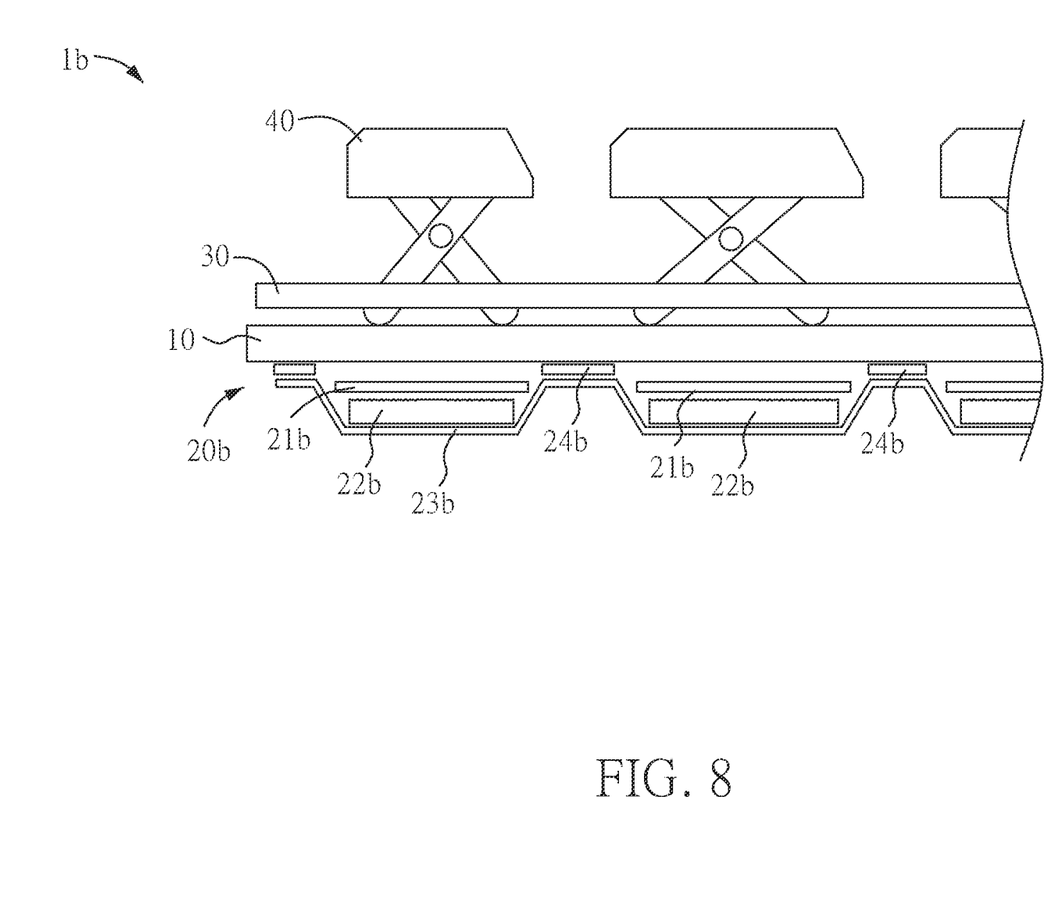
FIG. 8 is an exploded schematic diagram of a keyboard according to another embodiment of the present disclosure.

FIG. 8 is an exploded schematic diagram of a keyboard according to another embodiment of the present disclosure. Please refer to FIG. 8. The difference between the keyboard 1b of this embodiment and the above embodiment is the design of the backlight module 20b, so the base plate 10, the circuit board 30 and keys 40 denote the same reference numerals. In this embodiment, the shielding sheet 21b and the light guide plate 22b have long openings (i.e., the truncated portions of the shielding sheet 21b and the light guide plate 22b as shown in FIG. 8) so that the reflecting sheet 23b can pass through the long openings (i.e., the truncated portions) of the shielding sheet 21b and the light guide plate 22b and directly be adhesively connected to the base plate 10. Specifically, a portion of adhesive layers 24 can be disposed on the periphery of the reflecting sheet 23b; in addition, a portion of the adhesive layers 24b can be disposed at intervals on the upper surface 231b of the reflecting sheet 23b. Parts of the reflecting sheet 23b having the adhesive layers 24b pass through the long openings of the shielding sheet 21b and the light guide plate 22b to be adhesively connected to the base plate 10 so that the shielding sheet 21b and the light guide plate 22b are covered by the reflecting sheet 23b and fixed between the reflecting sheet 23b and the base plate 10. In this embodiment, the reflecting sheet 23b is directly adhesively connected to the base plate 10, so the shielding sheet 21b does not need to have the (second) slits, and the backlight module 20b can also be applied to the base plate 10 of adjustable length.

In continuation of the description above, the keyboard of the present disclosure comprises a base plate and a backlight module. The base plate has a long slit along the short axis direction to allow adjustment of the length of the base plate. A reflecting sheet of the backlight module comprises a plurality of (first) slits. By the structure described above, the length of the reflecting sheet can be adjusted by moving it along with the base plate. By the same token, the length of the backlight module can also be adjusted by moving it along with the base plate.

In addition, a light guide plate has a plurality of long openings which are rectangular. In other words, each of the long openings has at least one long side, and the long side is parallel to the long axis direction of the base plate. The central axis of each of the long openings is located between two adjacent rows on which the keys are disposed so that the light reflected by the light guide plate can be concentrated on the rows on which the keys are disposed. Thus, the light can be effectively guided by the light guide structures to improve the luminous efficiency of the backlight module.

In addition, a light guide structure of the light guide plate comprises a ring portion and at least one bend line portion. Due to the connection of the bend line portion to the ring portion, the light within the light guide plate can be concentrated on the ring portion and the bend line portion, and especially concentrated on the bend line portion. Moreover, the ring portion and the bend line portion are not prone to the formation of incomplete structures or flaws such as obvious missing corners, hollows, or unevenness, so the reflection effect and light transmittance can be improved, and the luminous efficiency of the backlight module can also be improved.

It is noted that the above-described embodiments are merely illustrative of preferred embodiments of the present disclosure, and that in order to prevent redundancy, not all possible combinations of the variations are described in detail; various changes and modifications may be made to the described embodiments without departing from the scope of the disclosure as described by the appended claims.

What is claimed is:

1. A keyboard, comprising:
 a base plate having a short axis direction and a long axis direction;
 a plurality of keys disposed on the base plate along the long axis direction, and the keys arranged to form a plurality of rows; and
 a backlight module disposed on a side of the base plate, the backlight module comprising:
  a shielding sheet comprising an upper surface and a lower surface, the upper surface facing toward the base plate;
  a light guide plate disposed on the lower surface of the shielding sheet, wherein the light guide plate comprises a plurality of long openings, and each of the long openings has at least one long side parallel to the long axis direction, each of the long openings has a central axis, the central axis is located between two adjacent rows on which the keys are disposed, and the central axis is corresponded to a light-shielding area of the keyboard; and a reflecting sheet disposed below the light guide plate.

2. The keyboard as claimed in claim 1, wherein the at least one long side of each of the long openings is located within the orthographic projection below the keys.

3. The keyboard as claimed in claim 1, wherein each of the long openings is rectangular.

4. The keyboard as claimed in claim 1, wherein there is a space between the two adjacent long openings in the long axis direction.

5. The keyboard as claimed in claim 1, wherein the reflecting sheet passes through the long openings and is adhesively connected to the shielding sheet.

6. The keyboard as claimed in claim 1, wherein a length of the long side of one of the long openings is greater than a width of one of the keys.

7. The keyboard as claimed in claim 1, wherein the base plate comprises at least one long slit disposed on the base plate along the short axis direction, and the reflecting sheet comprises a plurality of first slits, wherein when a length of the base plate is adjusted along the long axis direction, the reflective sheet can be adjusted and moved corresponding to the base plate by expansion of the first slits.

8. The keyboard as claimed in claim 7, wherein the two adjacent first slits are partly overlapped in the short axis direction, and there is a space between the two adjacent first slits in the long axis direction.

9. The keyboard as claimed in claim 7, wherein the reflecting sheet comprises a plurality of holes, and one end of each of the plurality of the first slits is connected to the holes.

10. The keyboard as claimed in claim 9, wherein the holes comprise a plurality of fixing holes, the fixing holes are arranged between the plurality of the first slits to form a least one slit distribution area, and the slit distribution area is arranged on the reflecting sheet along the short axis direction such that the reflecting sheet is divided into a first portion and a second portion by the slit distribution area in the long axis direction.

11. The keyboard as claimed in claim 7, wherein each of the first slits comprises a vertical section, and the vertical section is parallel to the short axis direction.

12. The keyboard as claimed in claim 11, wherein the plurality of the first slits further comprise a horizontal section, and the horizontal section is parallel to the long axis direction.

13. The keyboard as claimed in claim 12, wherein the vertical section and the horizontal section are connected to each other, and one end of the vertical section or one end of the horizontal section is connected to the fixing holes.

14. The keyboard as claimed in claim 10, wherein the holes comprise a plurality of through holes, and the diameter of each of the through holes is smaller than the diameter of each of the fixing holes, and one end of each of the plurality of the first slits is connected to the through holes.

15. The keyboard as claimed in claim 10, wherein the position of the slit distribution area corresponds to the position of the long slit of the base plate.

16. The keyboard as claimed in claim 1, wherein the light guide plate comprises a plurality of light guide structures corresponding to the keys respectively, each of the light guide structures comprises a ring portion and at least one bend line portion, the bend line portion connects to the ring portion, and the ring portion is formed by a plurality of bending portions.

17. The keyboard as claimed in claim 16, wherein the keyboard further comprises an elastic body having an annular base, and the ring portion is disposed corresponding to the annular base.

18. The keyboard as claimed in claim 16, wherein the bend line portion corresponds to one corner of one of the keys.

19. The keyboard as claimed in claim 16, wherein the light guide structures are a plurality of arc-grooves formed on a surface of the light guide plate.

20. A backlight module, applied to a keyboard, wherein the keyboard comprises a base plate and a plurality of keys, the base plate has a short axis direction and a long axis direction, wherein the keys disposed on the base plate along the long axis direction and arranged to form a plurality of rows, and the backlight module is disposed on a side of the base plate, the backlight module comprising:

a shielding sheet comprising an upper surface and a lower surface, the upper surface facing toward the base plate;

a light guide plate disposed on the lower surface of the shielding sheet, wherein the light guide plate comprises a plurality of long openings, and each of the long openings has at least one long side parallel to the long axis direction, each of the long openings has a central axis, the central axis is located between two adjacent rows on which the keys are disposed, and the central axis is corresponded to a light-shielding area of the keyboard; and a reflecting sheet disposed below the light guide plate.

* * * * *